US006721177B1

(12) United States Patent
Wang et al.

(10) Patent No.: US 6,721,177 B1
(45) Date of Patent: Apr. 13, 2004

(54) MOUNTING APPARATUS FOR DATA STORAGE DEVICE

(75) Inventors: Liang-Chin Wang, Tu-Chen (TW); Jian Hu, Shenzhen (CN)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 10/340,266

(22) Filed: Jan. 9, 2003

(30) Foreign Application Priority Data

Nov. 27, 2002 (TW) ...................................... 91219113 U

(51) Int. Cl.[7] ................................................. H05K 7/14

(52) U.S. Cl. .................... 361/685; 360/137; 312/332.1; 248/638

(58) Field of Search ................................ 361/679–687, 361/724–727, 747, 754, 759, 801, 796, 755, 729–730, 732, 752; 360/137, 137 D; 312/332.1, 333; 248/618, 633–638; 367/75.1–82

(56) References Cited

U.S. PATENT DOCUMENTS 6,038,128 A * 3/2000 Hood et al. ................. 361/687
6,356,441 B1 * 3/2002 Claprood .................... 364/685
6,377,452 B1 * 4/2002 Sasaki et al. ............... 361/687

* cited by examiner

*Primary Examiner*—Hung Van Duong
(74) *Attorney, Agent, or Firm*—Wei Te Chung

(57) ABSTRACT

A data storage device mounting apparatus includes a first drive bracket (10) fixedly mounted to a chassis (40) of a computer, and a second drive bracket (20) pivotably attached to the chassis. Two pins (54) are formed on each of opposite sides of a data storage assembly (50). The first bracket comprises first and second side plates (14, 16) each defining two slots (15) receiving the pins. The second side plate defines two openings (162) adjacent the slots. Two catches (164) and two positioning plates (168) extend outwardly from the second side plate at bottom and rear extremities of the openings respectively. The second bracket and one side comprises two legs (24). When the second bracket is pivoted down onto the first bracket, the legs cover the openings. Each leg is sandwiched between a corresponding pin and a corresponding positioning plate, and resiliently pressed inwardly by a corresponding catch.

18 Claims, 3 Drawing Sheets

21 20 22 24 26 52 54 50 420 42 40 15 14 120 12 10 16 15 164 162 168

MOUNTING APPARATUS FOR DATA STORAGE DEVICE

BACKGROUND OF THE INVENTION

1. Field of the Invention

The present invention relates to computer enclosures, and particularly to a computer enclosure having a mounting apparatus for readily attaching a data storage device in the enclosure.

2. Related Art

When a conventional computer is assembled, a drive bracket is firstly mounted in a computer enclosure. Data storage devices such as a hard disk drive (HDD), a floppy disk drive (FDD) and a compact disk read only memory (CD-ROM) drive are then attached to the drive bracket.

The drive bracket is typically secured to the computer enclosure by riveting or using a plurality of screws. U.S. Pat. No. 5,447,367 discloses a conventional drive bracket which is attached to a computer enclosure with screws. A screwdriver is required. This is inconvenient and time-consuming, and particularly costly in mass production facilities. Furthermore, during assembly, extra operation space for manipulating the screws is needed. This militates against the modern trend toward reducing the size of a computer. Moreover, screws can be accidentally lost during assembly. Similar problems are experienced when rivets are used instead of screws. A riveter is required, and extra operation space for manipulating the rivets is needed. Rivets can be accidentally lost during assembly.

Thus an improved mounting apparatus for data storage devices which overcomes the above-mentioned problems is desired.

SUMMARY OF THE INVENTION

Accordingly, an object of the present invention is to provide a mounting apparatus for easy and convenient installation or removal of data storage devices into or from a computer enclosure.

Another object of the present invention is to provide a mounting apparatus which does not require additional fasteners for attachment of a data storage device in a computer enclosure.

To achieve the above-mentioned objects, a data storage device mounting apparatus in accordance with a preferred embodiment of the present invention is for mounting a data storage assembly in a chassis of a computer. The data storage device mounting apparatus comprises a first drive bracket fixedly mounted to the chassis, and a second drive bracket pivotably attached to the chassis. The data storage assembly comprises a pair of positioning pins on each of opposite sides thereof. The first drive bracket comprises a first side plate and a second side plate cooperatively defining a space therebetween receiving the data storage assembly therein. The first and second side plates each define a pair of slots receiving corresponding positioning pins of the data storage assembly therein. The second side plate defines a pair of openings adjacent the slots respectively. A pair of catches and a pair of positioning plates extend outwardly from the second side plate at bottom and rear extremities of the openings respectively. The second drive bracket at one side comprises a pair of legs. When the second drive bracket is pivoted down onto the first drive bracket, the legs cover the openings. Each leg is sandwiched between a corresponding positioning pin and a corresponding positioning plate, and resiliently pressed inwardly by a corresponding catch. The data storage assembly is thereby securely mounted in the mounting apparatus.

Other objects, advantages and novel features of the present invention will be drawn from the following detailed description of preferred embodiments of the present invention with the attached drawings, in which:

DESCRIPTION OF THE PREFERRED EMBODIMENT

The present invention will be described in its preferred embodiment, and in conjunction with a data storage assembly.

Figure 1:
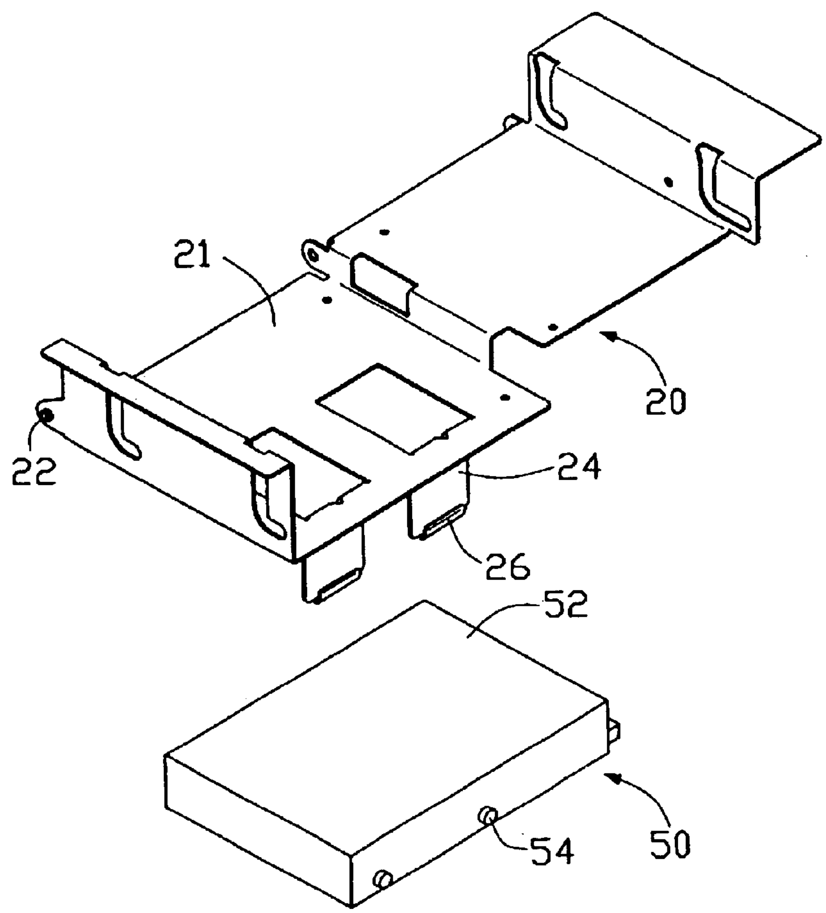
FIG. 1 is an exploded, isometric view of a data storage device mounting apparatus in accordance with a preferred embodiment of the present invention together with a data storage assembly and a chassis of a computer, the data storage device mounting apparatus comprising a first drive bracket mounted on the chassis and a second drive bracket.
Figure 1:
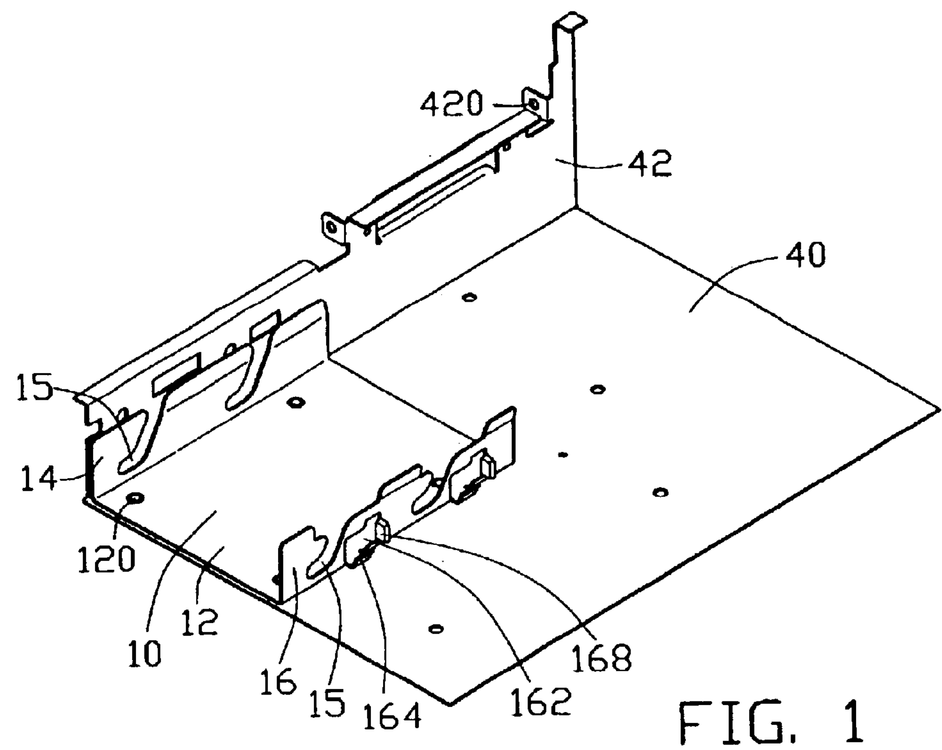

FIG. 1 shows a data storage device mounting apparatus in accordance with a preferred embodiment of the present invention, together with a data storage assembly 50 and a chassis 40 of a computer (not shown). The mounting apparatus includes a first drive bracket 10 fixedly mounted to the chassis 40, and a second drive bracket 20 pivotably attached to the chassis 40.

The data storage assembly 50 comprises a housing 52, and a data storage device (not visible) received in the housing 52. The data storage device may, for example, be a hard disk drive (HDD). A pair of positioning pins 54 is formed on each of opposite sides of the housing 52.

The chassis 40 comprises a side panel 42 extending perpendicularly from one side thereof. Three spaced pivot holes 420 (only two pivot holes 420 are shown in FIG. 1) are defined in the side panel 42.

Figure 2:
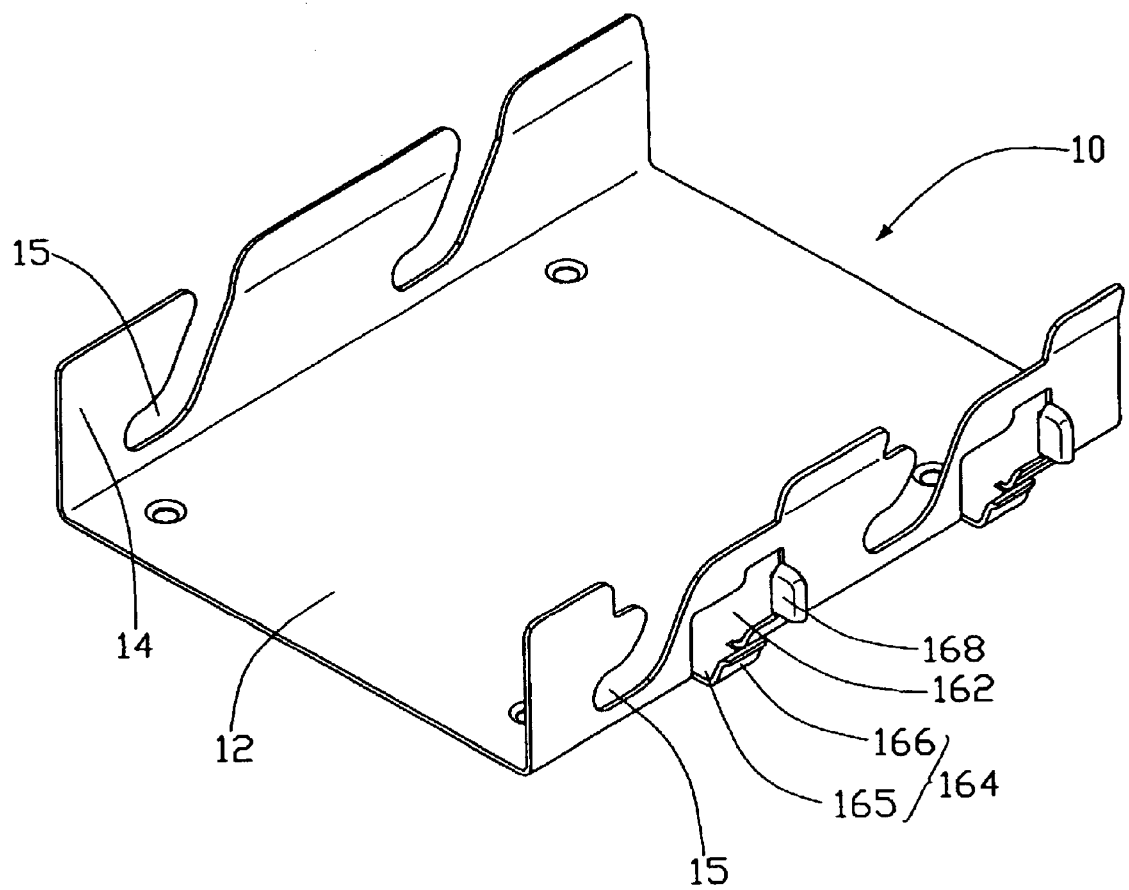
FIG. 2 is an enlarged view of the first drive bracket of the data storage device mounting apparatus of FIG. 1.

The first drive bracket 10 is mounted to the chassis 40 with a plurality of fasteners 120 such as rivets 120. The first drive bracket 10 comprises a bottom plate 12, and a first side plate 14 and a second side plate 16 extending upwardly from opposite edges of the bottom plate 12 respectively. The bottom plate 12 and first and second side plates 14, 16 cooperatively define a space (not labeled) therebetween for receiving the data storage assembly 50 therein. Referring also to FIG. 2, a pair of spaced guide slots 15 is defined in each of the first and second side plates 14, 16. The guide slots 15 extend obliquely downwardly and forwardly from top edges of the first and second side plates 14, 16 respectively, and then horizontally forwardly to terminate in bottom portions of the first and second side plates 14, 16 respectively. A pair of openings 162 is defined in the second side plate 16 rearwardly adjacent the guide slots 15 respectively. A catch 164 extends outwardly from a bottom extremity of each opening 162. The catch 164 comprises a proximal horizontal portion 165, and an engaging portion 166 extending obliquely upwardly and outwardly from an end of the horizontal portion 165. A positioning plate 168 extends outwardly from the second side plate 16 at a rear extremity of each opening 162.

The second drive bracket 20 comprises a top plate 21. Three spaced hollow pivots 22 are stamped from edge portions of a same longitudinal side of the second drive bracket 20, corresponding to the pivot holes 420 of the side panel 42 of the chassis 40. A frontmost one of the pivots 22 is stamped forwardly, and the other two of the pivots 22 are stamped rearwardly. A pair of legs 24 depends from the top plate 21 at an opposite longitudinal side of the second drive bracket 20. Each leg 24 comprises a rolled portion 26 at a distal end thereof.

Figure 3:
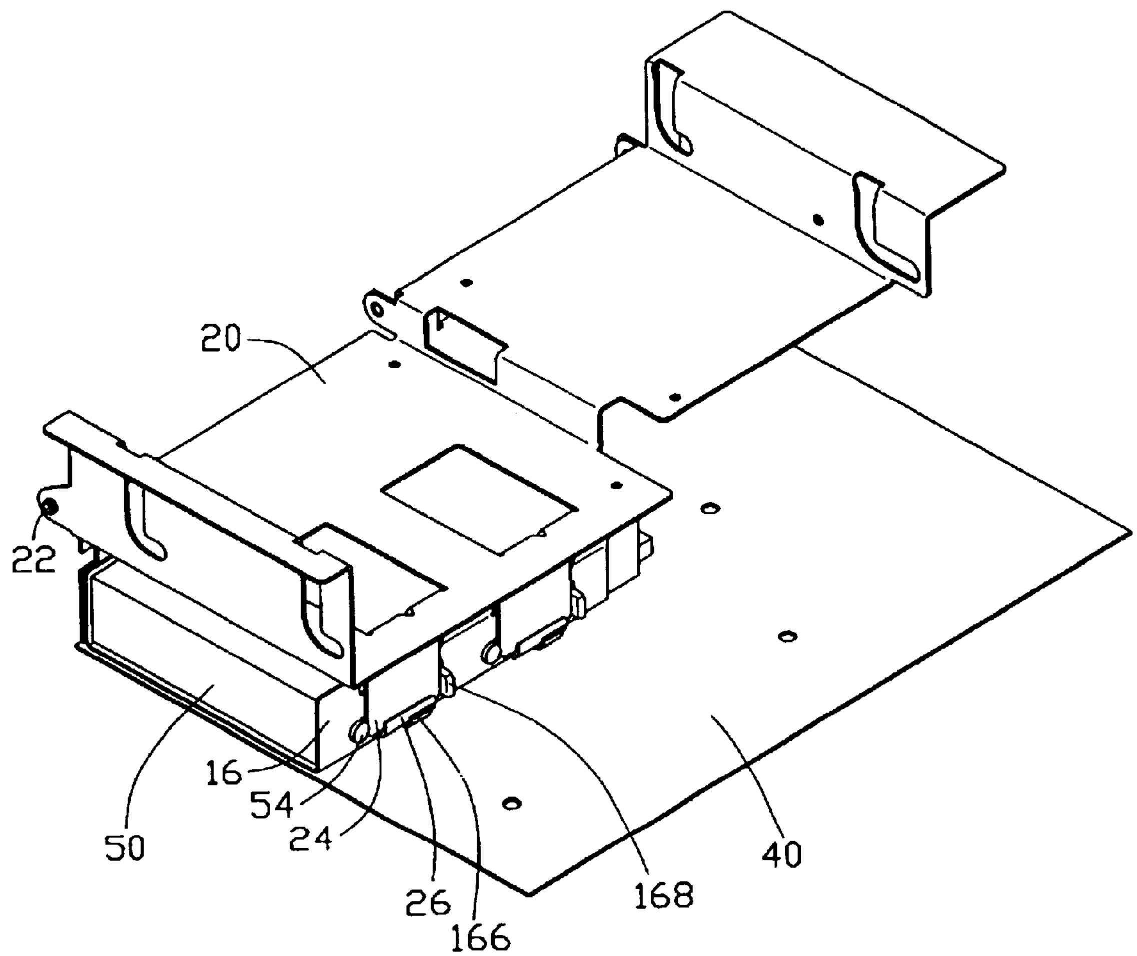
FIG. 3 is an assembled view of FIG. 1.

Referring to FIG. 3, in assembly, the data storage assembly 50 is placed above the first drive bracket 10 and moved downwardly and forwardly. The positioning pins 54 of the housing 52 are guided into sliding engagement in the guide slots 15 of the first and second side plates 14, 16 of the first drive bracket 10. The data storage assembly 50 is slid until the positioning pins 54 reach the terminations of the guide slots 15. The positioning pins 54 protrude beyond an outer surface of the second side plate 16. Thus, the data storage assembly 50 is received in the space between the bottom plate 12 and the first and second side plates 14, 16.

The pivots 22 of the second drive bracket 20 are then inserted into the pivot holes 420 of the side panel 42 of the chassis 40 respectively, so that the second drive bracket 20 is pivotably mounted to the side panel 42. The second drive bracket 20 is pivoted down toward the second side plate 16. The legs 24 of the second drive bracket move downwardly to cover the openings 162 of the second side plate 16. Front outer surfaces of the rolled portions 26 of the legs 24 are resiliently pressed inwardly by the engaging portions 166 of the catches 164. Each leg 24 is securely retained between the corresponding positioning plate 168 of the second side plate 16 and the corresponding positioning pin 54. In addition, the positioning pins 54 are retained at the terminations of the guide slots 15 by the respective legs 24. Thus the data storage assembly 50 is securely mounted in the chassis 40.

To remove the data storage assembly 50, the engaging portions 166 are pressed downwardly so that they substantially disengage from the rolled portions 26. The second drive bracket 20 is pivoted up away from the second side plate 16 of the first drive bracket 10, and the legs 24 are freed from the positioning plates 168 and the positioning pins 542. When the second drive bracket 20 has reached a substantially vertical position, the data storage assembly 50 is slid out of the guide slots 15 and thereby removed from the first drive bracket 10.

In the mounting apparatus of the present invention, the positioning pins 54 are retained in the guide slots 15 by the legs 24, and the legs 24 are securely retained between the positioning pins 54 and the positioning plates 168. Thus, the data storage assembly 50 is securely and reliably mounted in the first drive bracket 10. This is accomplished without the need for screws, and the second drive bracket 20 is pivotably attached to the first drive bracket 10. Therefore, the data storage assembly 50 is conveniently installed into or removed from the mounting apparatus.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A mounting apparatus for mounting a data storage assembly to a chassis of a computer, the data storage assembly comprising a pair of positioning pins on opposite sides thereof respectively, the mounting apparatus comprising:

a first drive bracket mounted to the chassis, and adapted for receiving the data storage assembly therein, the first drive bracket comprising a first side plate and a second side plate each defining a slot for receiving a corresponding positioning pin of the data storage assembly; and a second drive bracket pivotably attached to the chassis, the second drive bracket comprising a locking means engaging with the second side plate of the first drive bracket and locking a corresponding positioning pin in a corresponding slot, thereby securely mounting the data storage assembly in the mounting apparatus.

2. The mounting apparatus as described in claim 1, wherein the slots extend obliquely downwardly and forwardly from respective top edges of the first and second side plates, and then horizontally forwardly to terminate in respective bottom portions of the first and second side plates.

3. The mounting apparatus as described in claim 1, wherein the second side plate of the first drive bracket defines an opening adjacent the slot, and the locking means of the second drive bracket comprises a leg covering the opening.

4. The mounting apparatus as described in claim 1, wherein the chassis comprises a side panel defining a plurality of holes therein, and the second drive bracket comprises a plurality of pivots pivotably received in the holes respectively.

5. The mounting apparatus as described in claim 3, wherein the second side plate of the first drive bracket comprises a positioning plate extending from a rear extremity of the opening, and the leg of the second drive bracket is sandwiched between the corresponding positioning pin and the positioning plate.

6. The mounting apparatus as described in claim 5, wherein the second side plate comprises a catch having an oblique engaging portion abutting a distal end of the leg.

7. The mounting apparatus as described in claim 6, wherein the leg comprises a rolled portion at the distal end thereof, and the engaging portion of the catch presses the rolled portion toward the second side plate, thereby retaining the leg between the positioning pin and the positioning plate.

8. A data storage mounting assembly comprising:

a chassis;

a first drive bracket mounted to the chassis, the first drive bracket comprising a first side plate and a second side plate cooperatively defining a space therebetween, the first and second side plates each defining a slot therein, the second side plate comprising a latching means;

a data storage assembly received in the space, and comprising a positioning pin on each of opposite sides thereof, the positioning pins being received in corresponding slots; and a second drive bracket pivotably mounted to the chassis, the second drive bracket comprising a leg engaging with the latching means, thereby retaining the data storage assembly in the data storage mounting assembly.

9. The data storage mounting assembly as described in claim 8, wherein the slots extend obliquely downwardly and forwardly from respective top edges of the first and second side plates, and then horizontally forwardly to terminate in respective bottom portions of the first and second side plates.

10. The data storage mounting assembly as described in claim 8, wherein the second side plate of the first drive bracket defines an opening adjacent the slot, and the latching means comprises a catch and a positioning plate extending from bottom and rear extremities of the opening, respectively.

11. The data storage mounting assembly as described in claim 10, wherein the positioning plate sandwiches the leg with a corresponding positioning pin of the data storage assembly.

12. The data storage mounting assembly as described in claim 10, wherein the leg comprises a rolled portion at a distal end thereof, and the catch comprises an engaging portion pressing the rolled portion inwardly, thereby retaining the leg at the opening.

13. The data storage mounting assembly as described in claim 10, wherein the chassis comprises a side panel defining a plurality of holes therein, and the second drive bracket comprises a plurality of pivots pivotably received in the holes respectively.

14. A mounting apparatus assembly comprising:

a chassis defining a bottom face and a side face;

a pivot axis defined adjacent said side face;

a first drive bracket mounted on the bottom face and defining an upward cavity;

a latching device formed on one of said first drive bracket and said bottom face and located far away from said pivot axis;

a data storage device downwardly loaded into the cavity;

a restriction pin formed on the data storage device to engage the first drive bracket; and a second drive bracket pivotally mounted to the side face about said pivot axis, and including a locking leg latchably engaged with the corresponding latching device; wherein said data storage device is sandwiched between said first drive bracket and said second drive bracket.

15. The assembly as described in claim 14, wherein said second drive further includes a restraint section engaged with the restriction pin so as to prevent the data storage device from being withdrawn from the cavity.

16. The assembly as described in claim 14, wherein said first drive bracket defines a slot, and said restriction pin moves along said slot when said data storage device is downwardly loaded into the cavity.

17. The assembly as described in claim 15, wherein said restraint section is formed on the leg.

18. The assembly as described in claim 16, wherein said slot is curved with a horizontal section at an inner end thereof.

* * * * *